United States Patent
Hannagan et al.

[11] Patent Number: 5,920,934
[45] Date of Patent: Jul. 13, 1999

[54] READILY SEPARABLE, THREE MODE CONNECTOR FOR AIR-INFLATABLE SUPPORT

[75] Inventors: Angus Patrick Douglas Hannagan, Waterlooville; Michael Alan McGrath, Hayling Island, both of United Kingdom

[73] Assignee: Pegasus Airwave Limited, Waterlooville, United Kingdom

[21] Appl. No.: 08/908,380

[22] Filed: Aug. 7, 1997

[30] Foreign Application Priority Data

Aug. 9, 1996 [GB] United Kingdom .................. 9616769

[51] Int. Cl.⁶ .................................................. A47C 27/10
[52] U.S. Cl. ..................... 5/713; 137/625.21; 251/149.9; 285/124.1; 285/914
[58] Field of Search ............................. 285/124.1, 124.2, 285/124.3, 124.4, 124.5, 25, 123.1, 914; 5/706, 652.1, 710, 652.2, 713, 655.3; 137/625.21; 251/149.9

[56] References Cited

U.S. PATENT DOCUMENTS

| | | | |
|---|---|---|---|
| 1,708,273 | 4/1929 | Larsen ............................ | 137/625.21 X |
| 4,253,683 | 3/1981 | Jentsch et al. . | |
| 4,549,579 | 10/1985 | Bergmann ......................... | 137/625.21 |
| 4,676,269 | 6/1987 | Sarson . | |
| 4,716,934 | 1/1988 | Levenez ............................. | 137/625.21 |
| 5,035,016 | 7/1991 | Mori et al. . | |
| 5,103,519 | 4/1992 | Hasty . | |
| 5,152,319 | 10/1992 | Hannagan et al. ................. | 137/624.18 |
| 5,373,595 | 12/1994 | Johnson et al. . | |
| 5,584,085 | 12/1996 | Banko ......................................... | 5/710 |
| 5,647,079 | 7/1997 | Hakamium et al. ................. | 285/124.3 |
| 5,794,288 | 8/1998 | Soltani et al. ............................. | 5/713 |

FOREIGN PATENT DOCUMENTS

| | | | |
|---|---|---|---|
| 771968 | 4/1957 | United Kingdom ................... | 285/914 |
| 2 038 970 | 7/1980 | United Kingdom . | |
| 1 595 417 | 8/1981 | United Kingdom . | |
| WO 92/07541 | 5/1992 | WIPO . | |

*Primary Examiner*—Lynne A. Reichard
*Assistant Examiner*—Greg Binda
*Attorney, Agent, or Firm*—Larson & Taylor

[57] ABSTRACT

A connector for use in connecting an air-inflatable mattress to a control unit, where the connector has three modes of operation: Off; On; and CPR (Cardio-Pulmonary Resuscitation) when the male body part and the female body part are mutually engaged. These modes arise from different alignments of the air passages of the first component and second component of the male body part at surfaces which abut one another. Fluid supply lines to be connected are attached to the unions. The female body part is attached to a wall of the control unit, and the male body part is on the ends of the supply lines running to the air-inflatable mattress.

10 Claims, 6 Drawing Sheets

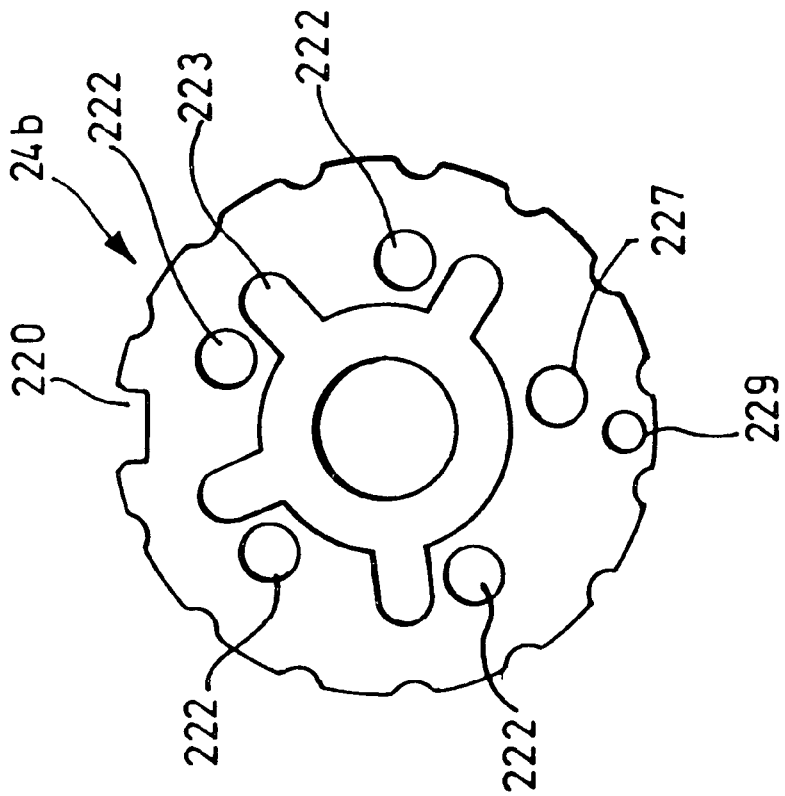
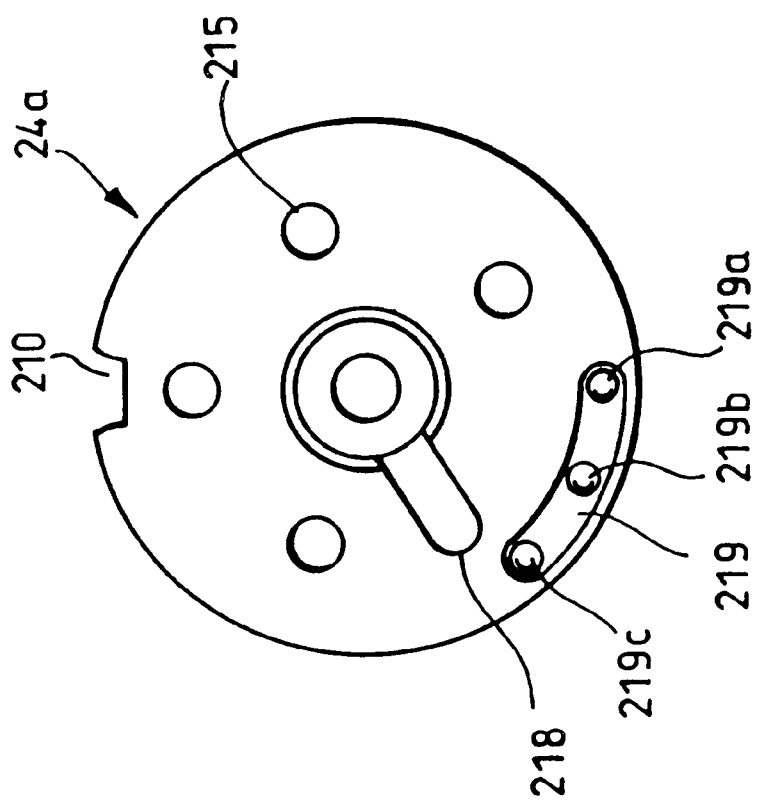

5,920,934

READILY SEPARABLE, THREE MODE CONNECTOR FOR AIR-INFLATABLE SUPPORT

FIELD OF THE INVENTION

The present invention relates to a connector for fluid carrying pipes, more particularly a connector for use in connecting an air-inflatable support for a human or animal body, e.g. a mattress, to a control unit. The invention also relates to an inflatable support having the control unit and the connector.

DESCRIPTION OF THE PRIOR ART

The use of air-inflatable mattresses for the prevention of bed-sores is well known, and is described, for instance, in GB-A-1 595 417. Pegasus Airwave Ltd. sell a range of mattresses for this purpose, e.g. the Airwave Plus™, in which an array of transverse air tubes are sequentially inflated and deflated. These mattresses are supplied with air from compressors, which are usually located in a control unit.

It has been usual for a connector between an air-inflatable mattress and a control unit to consist of a plug and socket. When the plug and socket are engaged, either by a screw or bayonet fixing, the pipes that run from the control unit and those that run to the air-inflatable mattress are connected (see, for example, FIGS. 14 and 15 of WO92/07541). Although this enables a mattress to be disconnected from one control unit and connected to another control unit, the mattress deflates when it is disconnected.

When a air-inflatable mattress is used to support seriously ill patients, it is important that the mattress can be deflated rapidly so that cardiopulmonary resuscitation (CPR) can be carried out on the support surface beneath. In the past, this deflation has been carried out by disconnecting the connector or by puncturing the mattress itself. Disconnecting the connector does not deflate the mattress rapidly enough, and puncturing the mattress is very costly.

WO92/07541 discloses a complicated mechanism in the control unit that enables deflation of an air-inflatable mattress of the air-loss type. This mechanism reverses the flow of a blower that usually inflates the mattress, so as to deflate the mattress. This enables the mattress to be reduced to atmospheric pressure, as the tubes are not fully sealed from the atmosphere, and this method does not provide a fast enough deflation time.

SUMMARY OF THE INVENTION

The present invention aims to ameliorate and overcome the problems of the prior art, in particular to provide a connector which can be used to achieve safe and efficient operation of an air-inflatable mattress, while permitting also rapid deflation.

Accordingly, in a first aspect of the present invention provides a connector for connecting at least one pair of fluid flow lines, having two body parts which are engageable in a coupled position and are readily separable to disconnect the fluid flow lines. Each body part has at least one fluid flow passage connectable to one of said fluid flow lines, and the connector has at least two modes when the two body parts are in the coupled position. In the first mode the fluid flow passage or passages of a first body part is or are in fluid communication with the respective passage or passages of the second body part for throughflow through the connector, and in the second mode the passage or passages of the first body part is or are in fluid communication with a venting passage or passages extending through at least one of the body parts, thereby to vent the fluid flow lines connected to the first body part to an exterior space. Preferably, the engagement and disengagement of the two body parts can be achieved by hand without the use of any tools, and this engagement and disengagement can take place without the disconnection of the fluid flow lines from the connector body parts.

Preferably the connector has a third mode when the two body parts are in the coupled position in which the fluid flow passage or passages of the first body part is or are sealingly closed within the first body part, and it is further preferred that the two body parts are separable when the connector is in the third mode, but not when it is in the first or second modes. These features have the advantage that any device, e.g. a mattress to which the connector is attached can be sealed, before the connector is disconnected, and that accidental disconnection of the connector while the mattress is in normal operation is avoided.

The switching of the different connector modes may achieved by rotating a first component of the first body part relative to a second component of the first body part, or by any other suitable means. The rotation can by hand. It is further preferred that in the second mode the venting passage is in fluid communication with a further passage in said second body part which is connected to a fluid flow line at a pressure less than that of the exterior space, to aid venting. This allows for any fluid-inflated object attached to the connector to be rapidly deflated.

A plurality of pairs of members for connection to fluid flow lines may be provided, depending on the nature of the devices being connected.

The second body part may include a support and one or more fluid flow members providing the fluid flow passage or passages therein for connection to the fluid flow line or lines. The fluid flow member or members may be mounted in the support so that the member or members are floating with respect to the support. This makes the engaging and disengaging of the two body parts easier, since the members can move slightly so that any slight manufacturing errors do not cause problems.

A second aspect of the present invention provides a connector for connecting at least one pair of fluid flow lines, having two body parts which are engageable in a coupled position. Each body part has at least one fluid flow passage connectable to one of the fluid flow lines. The connector has at least two modes when the two body parts are in the coupled position. In the first mode the fluid flow passage or passages of a first body part is or are in fluid communication with the respective passage or passages of the second body part for throughflow through the connector. In the second mode the passage or passages of the first body part are dislocated by the rotation of a first component of the first body part relative to a second component of the first body part, the first and second components having mutually abutting faces at which the dislocation occurs such that the dislocated passage or passages are sealed at the abutting faces of the components in the second mode whereby the fluid flow line or lines which are connected to the first body part are sealed.

The rotation of the first component of the first body part relative to the second component of the first body part may be achievable by hand, and a plurality of pairs of fluid flow lines may be connectable.

A third aspect of the present invention provides an inflatable support for a human or animal body, having a plurality of groups of inflatable cells, each group consisting of at least one cell, a control unit for controlling the fluid supply to the respective groups of inflatable cells, at least one fluid supply line from said control unit to said cells, and in said fluid supply line or lines a connector as described above of first and second aspects of the present invention. The inflatable support can be a device such as an airinflatable mattress for the prevention of bed sores for human patients, or a cushion for a wheel chair for a similar purpose.

BRIEF INTRODUCTION OF THE DRAWINGS

A specific embodiment of the present invention will now be described in detail by way of non-limitative example with reference to the accompanying drawings in which;

FIGS. 4a and 4b show respectively the face of the first and second components which are adjacent in the male body part 2 of the connector in FIG. 1.

Figure 5C:
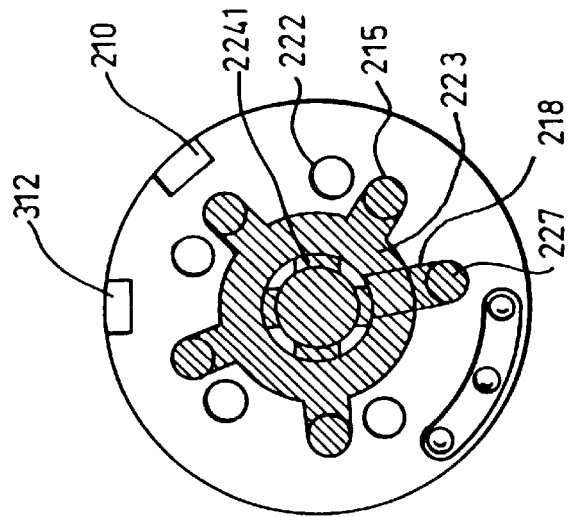
Figure 5B:
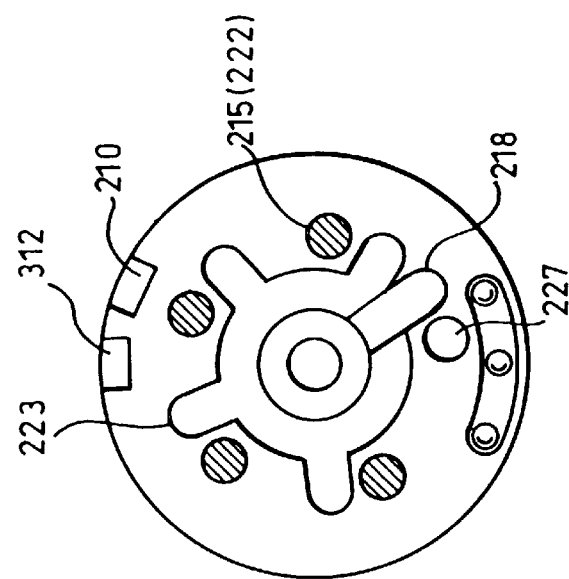
Figure 5A:
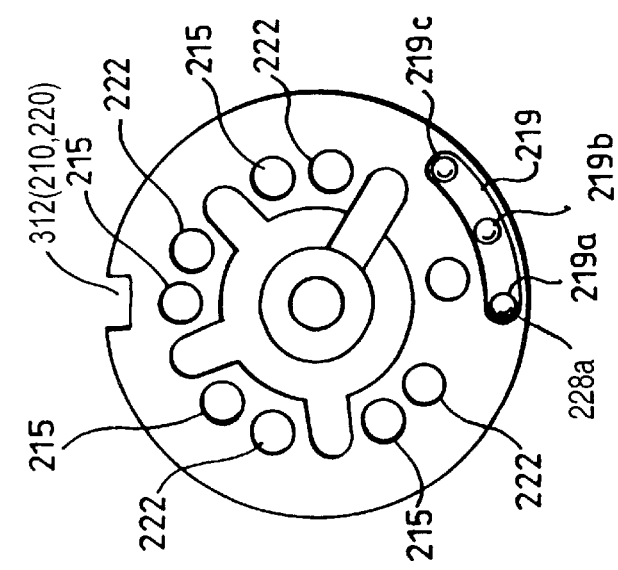

FIGS. 5a, b and c illustrate the three modes of operation of the connector by showing a projection of the face 24b shown in FIG. 4b onto the face 24a shown in FIG. 4a.

Figure 6:
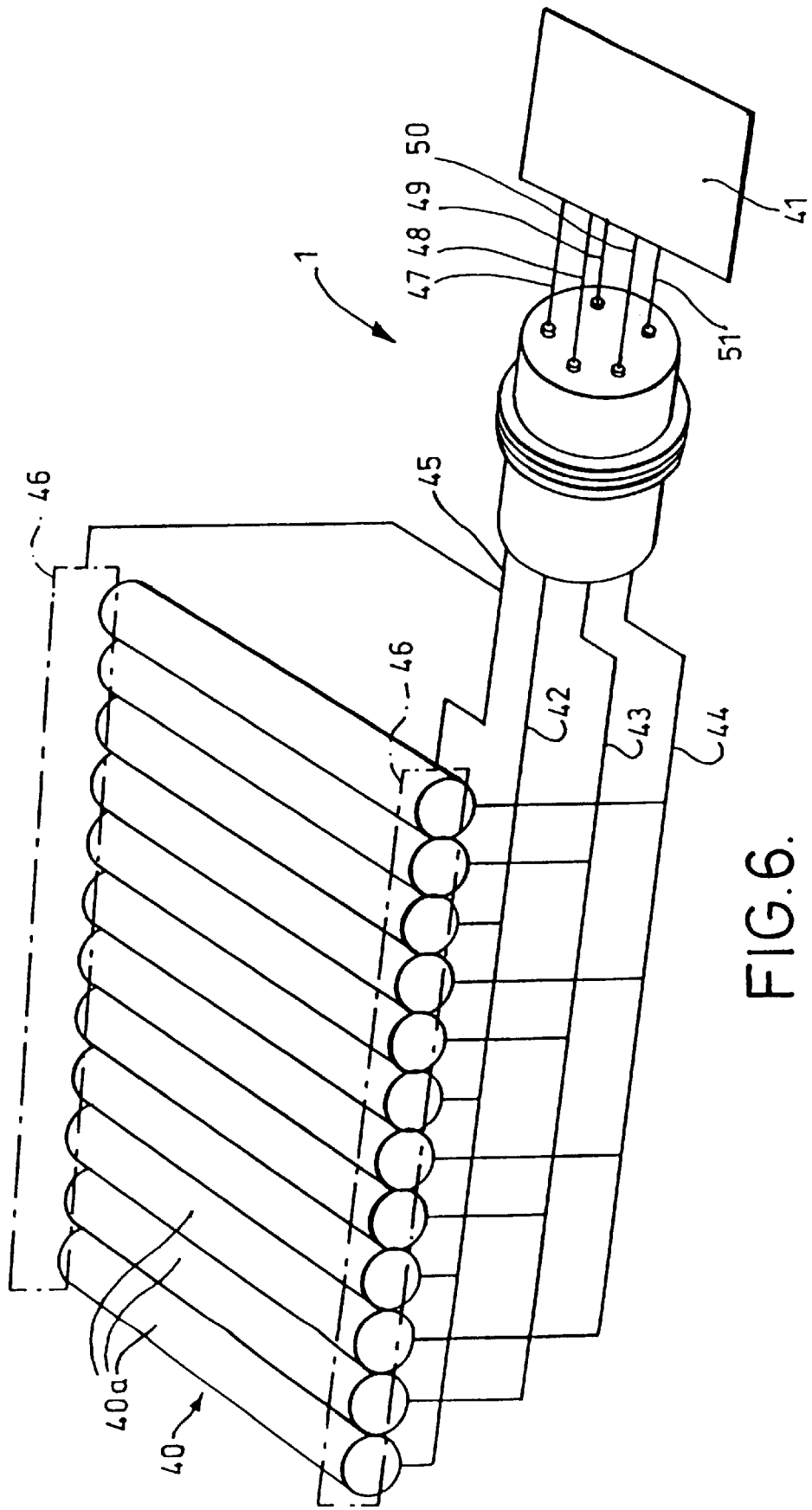

FIG. 6 is a diagrammatic view of an air-inflatable mattress with the connector and its control unit.

DESCRIPTION OF THE PREFERRED EMBODIMENT

Referring to the figures, FIG. 6 shows a connector 1 connecting an air-inflatable mattress 40, such as an Airwave Plus™ sold by Pegasus Airwave Ltd. and intended for the control and prevention of bedsores, to a control unit 41, which includes compressors for inflating tubes in the mattress and also a suction source. The control unit 41 is generally of conventional type for such a mattress, and need not be described in detail here.

The mattress has four air-supply lines; three of these lines 42,43,44 carry air to sequentially inflate and deflate three arrays of inflatable cells in the form of transverse tubes 40a in the mattress, and the fourth tube air-supply line 45 inflates inflatable side-formers (which for clarity are shown notionally by broken lines 46) of the mattress. In normal operation of the mattress 40, supporting a patient, air is supplied to and vented from the three arrays of tubes 40a in a predetermined sequence under control of the control unit 41. This operation is conventional and need not be described here.

Each of the air-supply lines 42–45 is attached to a respective line union 214 (FIGS. 1 and 2) fitted to a male body part 2 of the connector 1. Each line union 214 is in fluid communication with an air passage 215 in a first component 21 of the male body part 2. The four air passages 215 are open at the surface 24a (FIG. 4a) of the first component 21 of the male body part 2.

Figure 3:
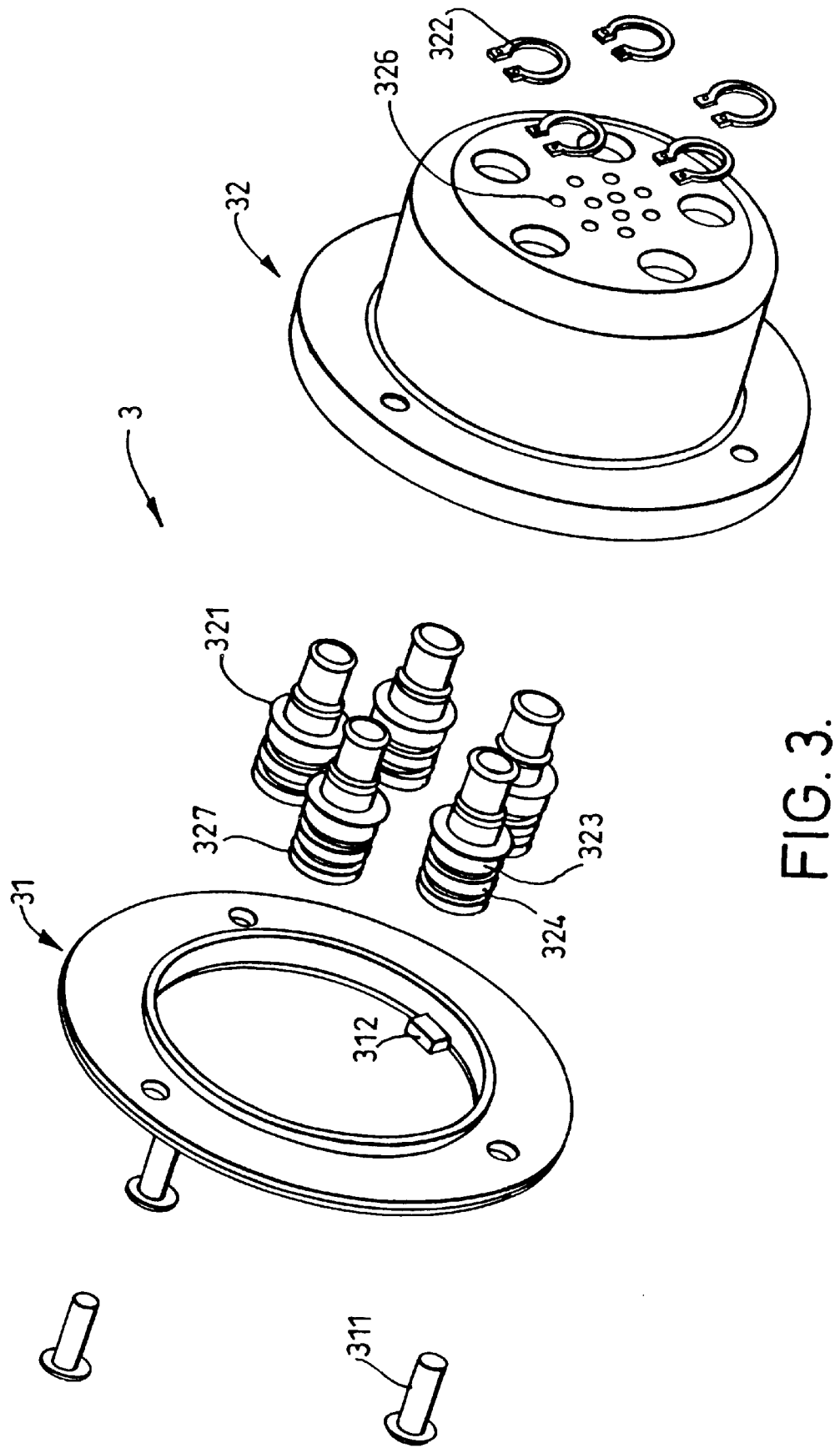
FIG. 3 shows an exploded view of the female body part 3 of the connector in FIG. 1.

Four corresponding air-supply lines 47–50 run from the control unit 41 and connect to four line unions 321 of a female body part 3 of the connector 1 (FIG. 3). Additionally, a vacuum line 51 runs from the control unit 41 and connects to a vacuum line union 327, which is identical in structure to the line unions 321.

When the male body part 2 which is substantially cylindrical and the female body part 3 which is bell shaped are engaged, each of the four line unions 321 are in fluid communication with an air passage 222 in a second component 22 of the male body part 2, and the vacuum pipe union 327 is in fluid communication with a vacuum passage 227, which is also in the second component 22 of the male body part 2. The air passages 222 and the vacuum passage 227 open at the surface 24b (FIG. 4b) of the second component 22 of the male body part 2.

The connector has three modes of operation: Off; On; and CPR (Cardio-Pulmonary Resuscitation) when the male body part 2 and the female body part 3 are mutually engaged. The functioning of these three modes is illustrated by FIGS. 5 a, b and c which show the alignment of the air passages of the first component 21 and second component 22 of the male body part at the surfaces 24a and 24b which abut one another. This functioning will be described first here, to give understanding of how the connector operates.

FIG. 5a shows the connector in the "Off" mode; the four air passages 215 of the first component 21 are sealed by the surface 24b of the second component. Likewise, the four air passages 222 and the vacuum passage 227 are sealed by the surface 24a of the first component. As the four air passages 215 are sealed, the four air-supply lines to the mattress which are connected to the line unions 214 are also sealed, preventing any air flowing from the mattress.

FIG. 5b shows the connector in the "On" mode; each of the four air passages 215 is aligned with, and in fluid communication with, a respective one of the four air passages 222 (as indicated by the cross-hatching in FIG. 5b). Therefore, in this mode, the air supply lines 47–50 connected to the line unions 321 are in fluid communication with the four air-supply lines 42–45 to the mattress which are connected to the line unions 214. The flow through the connector is in a substantially straight line with no impedance and this reduces noise and any extra work for compressors pumping the air that would arise from changes in the flow direction.

FIG. 5c shows the connector in the "CPR" mode; each of the four air passages 215 are aligned with a vacuum space 223, which is a recess in the face 24b of the second component 22 (see FIG. 4b). The vacuum space 223 and the air passages 215 are shown cross-hatched in FIG. 5c to indicate this connection. The vacuum space 223 is connected to the vacuum passage 227 by a vacuum slot 218, which is a slot in the face 24a of the first component 21 (see FIG. 4a). The vacuum space 223 is also in fluid communication with the atmosphere via air outlets 2241. The detailed operation of the connector in the "CPR" mode is described below.

Figure 1:
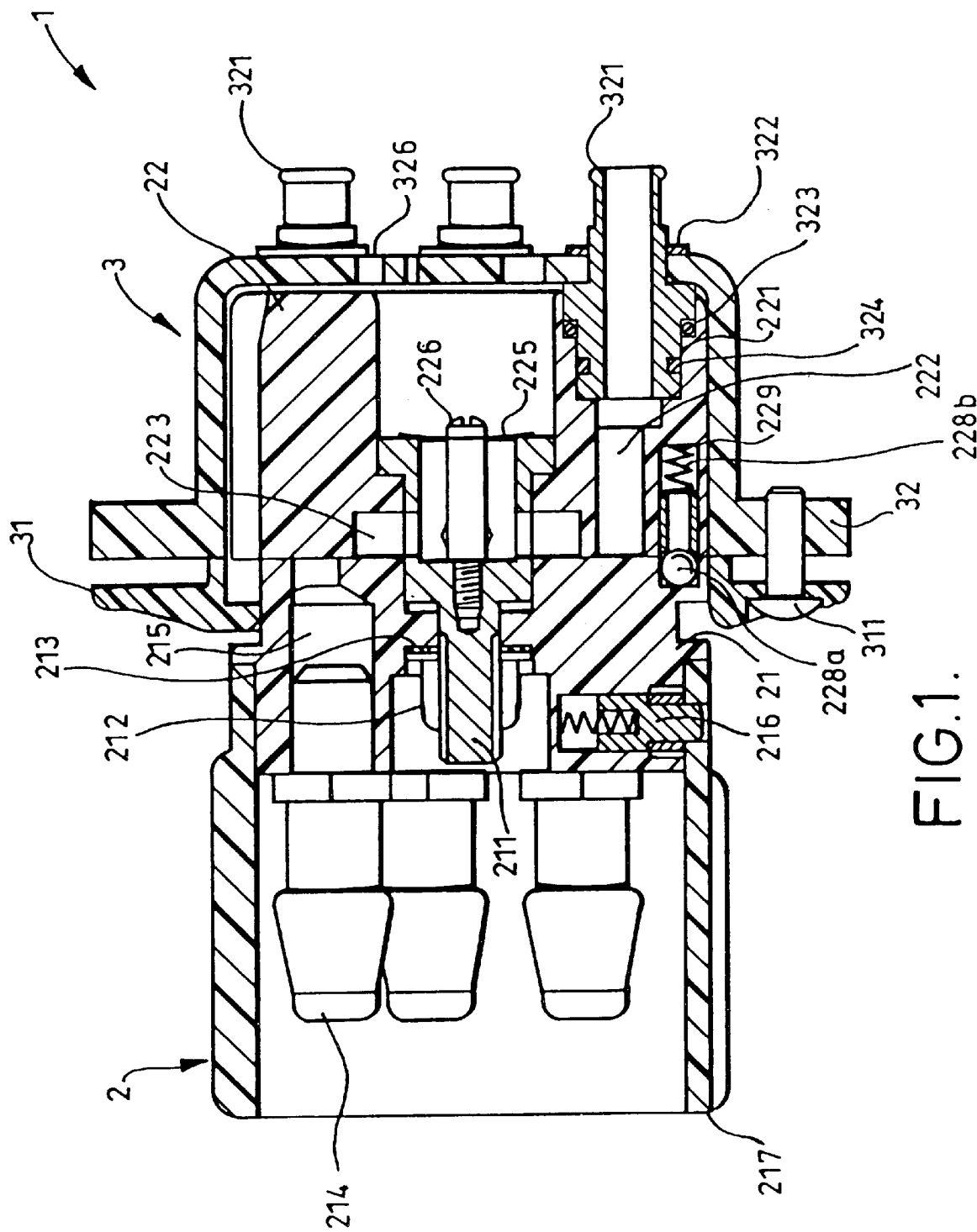
FIG. 1 shows a cross-section of a connector embodying the present invention with male and female body parts engaged and with the connector in the "Off" mode.
Figure 2:
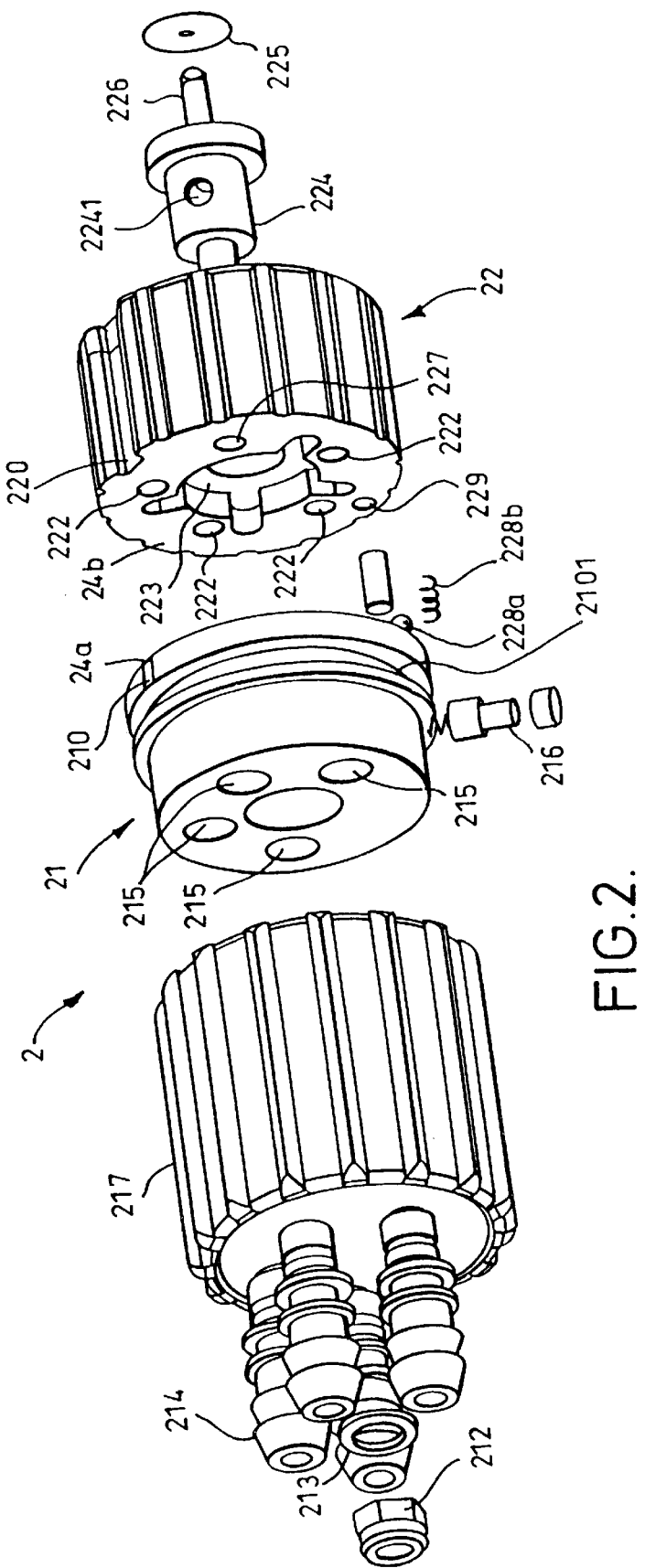
FIG. 2 shows an exploded view of the male body part 2 of the connector in FIG. 1.

These three different modes of the connector are obtained by three different predetermined relative rotational orientations of the first component 21 and the second component 22 of the male body part 2; the two components 21 and 22 are moveable between the three relative orientations by the rotation of the first component 21 relative to second component 22. The two components 21 and 22 have, as mentioned, opposed abutting surfaces 24a (FIG. 4) and 24b (FIG. 4b) which slide on one another and are rotatably held together by a metal insert 224 which passes through the two components, and is secured by a nut 212 on a spindle 211 of the metal insert 224 (FIG. 2). In order to allow for smooth rotation a combined washer and O-ring 213 is interposed between the nut 212 and the first component 21. A spring 228b and ball 228a are set into a blind bore 229 in the surface 24b of the second component 22 and when the two components 21 and 22 are in any one of the three predetermined relative orientations, the ball 228a sits in one of three detents 219 a, b & c (FIG. 1 and FIGS. 5 a, b and c) formed in a groove 219 on the surface 24a of the first component 21. When the two components 21 and 22 are rotated relative to one another the ball 228a runs in the groove 219 between the detents 219 a, b & c.

The first component 21 (FIG. 2) of the male body part 2 has a grooved cover 217, which also serves as a handle, releasably fixed to it. This handle enables the rotation by hand of the first component 21 of the male body part relative to the second component 22 of the male part 2. The second component 22 of the male body part 2 is, in the connected condition of the connector 1, tightly engaged with the female body part 3. As described below, the female body part 3 is fixed in place, but it may alternatively be free, to be gripped manually.

The cover 217 is releasably attached to the first component 21 by a spring-biased catch 216. The cover 217 can also serve to fix one end of a sheath (not shown) covering all the air-supply lines running from the air-inflatable mattress 40. This sheath maintains the lines as a compact bundle.

When the male body part 2 and the female body part 3 are brought together (FIG. 1) the inner ends of the line unions 321 sealably mate with four ports 221 in the second component 22 of the male body part 2. The ports 221 connect directly to the passages 222 described above. The seal between each line union 321 and each port 221 is formed by two O-rings, 323 and 324. As best shown in FIG. 1, O-rings 323 and 324 are of different diameters and the inside surface of each of the ports 221 is stepped so as to ease the insertion of the line unions 321 into the ports 221 when the male and female body parts 2, 3 are brought together. This feature also helps to provide a tight seal against air leakage. It is the tight fit between the O-rings 323 and 324 and the ports 221 that frictionally keeps the male and female body parts together whilst the connector is in the "Off" mode. In this mode, however, the male and female body parts 2, 3 are readily separable by pulling by hand, and are readily engageable also by hand.

In the same manner as the line unions 321, the vacuum line union 327 mates with a vacuum port (not shown) in the second component 22. This vacuum port connects directly to the vacuum passage 227.

The female body part 3 (FIG. 3) comprises first and second main components 31 and 32 which, in use, clamp a mounting wall (not shown) between them, and are secured together by bolts 311. This mounting wall may be for example a wall of the control unit 41 itself having an aperture receiving the connector 1. Alternatively it may be a wall of another fixed body. The four line unions 321 and the vacuum line union 327 are attached to the second component 32 by clips 322. The four line unions 321 and the vacuum line union 327 are not tightly fixed by the clips 322 and the slight movement that can occur makes the bringing together of the male and female body parts of the connector easier.

A key 312 projects inwardly on the first component 31, which has a ring structure. When the male and female body parts 2, 3 are brought together, the key 312 first slides along a groove 220 on the second component 22 of the male body part 2 then along a groove 210 on the first component 21 of the male body part into a circumferential recess 2101 (FIG. 2). The key 312 moves along the recess 2101 when the components 21 and 22 of the male body part are rotated relative to each other, to lock the male and female body parts 2, 3 together against disconnection except in the 'Off' position.

The grooves 220 and 210 are aligned only when the connector is in the "Off" mode, and therefore the male and female body parts can only be engaged and disengaged when the connector is in the "Off" mode. In this mode the mattress is isolated, i.e. the air supply lines 42–45 are sealed by the abutment of the faces 24a, 24b, as described above, and therefore when the connector is disengaged the mattress does not deflate. If the air supply lines to the mattress were opened by accidental disconnection the mattress would rapidly deflate which can severely disturb a patient supported on the mattress.

When the connector is in the "CPR" mode (see FIG. 5c), the air passages 215 are aligned with the vacuum space 223. This vacuum space 223 is connected to vacuum, via the vacuum slot 218 and the vacuum passage 227 that is connected to a vacuum line 51 by the vacuum line union 327. The vacuum space 223 is also vented to the atmosphere through air outlets 2241 in the metal insert 224 and via a flap valve 225 and vent holes 326 in the female body part 3. The flap valve 225 is attached to the metal insert 224 by a spindle 226. In operation, when the need arises to deflate all cells of the bed rapidly, the connector is turned to the "CPR" mode, and initially the venting air from the mattress, which enters the connector through the line unions 214 leaves via the flap valve 225 and the vent holes 326. However, when the venting air reaches close to atmospheric pressure, the flap valve 225 will naturally close, and the suction provided by the control unit will take over the exhaustion of the air, until the mattress is fully deflated.

In trials, it has been demonstrated that an Airwave Plus™ mattress attached to a connector of the present invention can be fully deflated in 15 seconds. This rapid deflation is essential if the patient supported by the mattress undergoes cardiac arrest, as any delay in starting CPR can adversely affect the chances of the patient making a recovery. Previous methods of deflation have included disconnecting the mattress from the control unit, which is often difficult and slow, or by puncturing the mattress. Neither of these procedures are as effective as that provided by the connector of the present invention. If the air lines to the mattress were opened to atmosphere simply by the action of disengaging the parts of the connector, there would always be a risk of an accidental disconnection causing deflation during normal operation of the mattress.

The connector is mainly constructed out of plastics, preferably glass-filled nylon, although the line unions 321, 327 and 214 and clips 322 are made from metal. Additionally, the insert 224 that holds the two components, 21 and 22, of the male body part 2 together and all its fittings, are made from metal, to provide strength. The catch 216 and the positioning ball bearing and spring 228 are also manufactured from metal, again to provide strength and resistance to wear.

It should be understood that a preferred embodiment of the present invention has been described above by way of example only and various alternative features or modifications from what has been described and illustrated can be made within the scope of the invention.

What is claimed is:

1. An inflatable support for a human or animal body, having a plurality of groups of inflatable cells, each group consisting of at least one cell, a control unit for controlling a fluid supply to the respective groups of inflatable cells, fluid flow lines from said control unit to said cells, and a connector in said fluid supply lines, said connector having two body parts which are engageable in a coupled position and are readily separable to disconnect the fluid flow lines, each said body part having at least one flow passage connectable to one of said fluid flow lines, and the connector having a venting passage extending through at least one of the body parts and connecting to exterior space, the connector having a plurality of modes when said two body parts are in said coupled position, comprising a first said mode in which said flow passage of a first one of said body parts is in fluid communication with the respective flow passage of the second one of said body parts for throughflow of fluid through the connector, a second said mode in which the flow passage of said first body part is in fluid communication with said venting passage, thereby to vent a fluid flow line connected to the first body part to exterior space, and a third said mode in which said flow passage of said first body part is sealingly closed within the first body part.

2. An inflatable support according to claim 1 in which said two body parts are separable when the connector is in the third mode, but not when the connector is in the first and second modes.

3. An inflatable according to claim 1 in which switching of the different connector modes is achieved by rotating a first component of the first body part relative to a second component of the first body part.

4. An inflatable according to claim 3, wherein the rotation of the first component of the first body part relative to the second component of the first body part is achievable by hand.

5. An inflatable according to claim 1 in which in the second mode said venting passage is in fluid communication with a further passage in said second body part which is connectable to a fluid flow line at a pressure less than that of the exterior space, to aid venting.

6. An inflatable according to claim 1, wherein a plurality of pairs of fluid flow lines are connectable by the connector, said first and second body parts each having a plurality of said flow passages.

7. An inflatable according to claim 1, wherein said second body part includes a support and at least one fluid flow member providing said flow passage therein for connection to the fluid flow line, wherein said fluid flow member is mounted in the support so that the fluid flow member is floatingly movable with respect to the support.

8. An inflatable support for a human or animal body, having
a plurality of groups of inflatable cells, each group consisting of at least one cell,
a control unit for controlling a fluid supply to the respective groups of inflatable cells,
fluid flow lines from said control unit to said cells, and
a connector in said fluid supply lines, said connector having first and second readily disconnectable body parts which are engageable in a coupled position, each said body part having at least one flow passage connectable to one of said fluid flow lines, said first body part having first and second relatively rotatable components through which said flow passage thereof extends, said first and second components respectively having mutually abutting faces which are maintained in abutment during their relative rotation, the connector having at least two modes when the two body parts are in the coupled position, wherein in a first said mode said fluid flow passage of a first one of said body parts is or are in fluid communication with the respective flow passage of the second one of said body parts for throughflow through the connector, and in a second said mode said flow passage of the first body part is dislocated by rotation of said first component of the first body part relative to said second component of the first body part, the dislocation occurring at said mutually abutting faces are such that the dislocated flow passage is sealed at said mutually abutting faces in the second mode whereby the fluid flow line which is connected to said first body part is sealed.

9. An inflatable according to claim 8, in which the rotation of the first component of the first body part relative to the second component of the first body part is achievable by hand.

10. A connector according to claim 8, wherein said body parts have a plurality of said flow passages whereby a plurality of pairs of fluid flow lines are connectable.

* * * * *